United States Patent
Kim (10) Patent No.: US 10,220,476 B2
(45) Date of Patent: Mar. 5, 2019

(54) METHOD OF MANUFACTURING AIR CONDITIONING CONDENSER

(71) Applicant: SAMWON INDUSTRIAL CO., LTD., Gwangju (KR)

(72) Inventor: Youngjin Kim, Gwangju (KR)

(73) Assignee: SAMWON INDUSTRIAL CO., LTD., Gwangju (KR)

( * ) Notice: Subject to any disclaimer, the term of this patent is extended or adjusted under 35 U.S.C. 154(b) by 377 days.

(21) Appl. No.: 14/872,303

(22) Filed: Oct. 1, 2015

(65) Prior Publication Data

US 2016/0214216 A1    Jul. 28, 2016

(30) Foreign Application Priority Data

Jan. 27, 2015  (KR) .......................... 10-2015-0012808

(51) Int. Cl.

| | |
|---|---|
| *B23P 15/26* | (2006.01) |
| *F25B 39/04* | (2006.01) |
| *F28D 1/053* | (2006.01) |
| *F28F 1/12* | (2006.01) |
| *F28D 21/00* | (2006.01) |
| *F28D 1/02* | (2006.01) |

(52) U.S. Cl.
CPC .............. *B23P 15/26* (2013.01); *F25B 39/04* (2013.01); *F28D 1/0535* (2013.01); *F28D 1/05316* (2013.01); *F28F 1/126* (2013.01); *F28D 2001/028* (2013.01); *F28D 2021/0084* (2013.01); *F28F 2215/04* (2013.01); *F28F 2225/04* (2013.01); *F28F 2225/06* (2013.01); *F28F 2270/00* (2013.01); *F28F 2275/045* (2013.01)

(58) Field of Classification Search
CPC .... B23P 15/26; F28D 1/0535; F28D 1/05316; F28D 2021/0084; F28D 2001/028; F28F 1/126; F28F 2270/00; F28F 2215/04; F28F 2225/04; F28F 2275/045; F28F 2225/06; F25B 39/04
See application file for complete search history.

(56) References Cited

U.S. PATENT DOCUMENTS

2013/0220584 A1*  8/2013  Mishiro .................. F25B 39/00
                                                                 165/143

FOREIGN PATENT DOCUMENTS

| KR | 1020140023580 | 2/2014 |
| KR | 1015400710000 | 7/2015 |

* cited by examiner

*Primary Examiner* — John C Hong
(74) *Attorney, Agent, or Firm* — IPLA P.A.; James E. Bame (57) ABSTRACT

A method of manufacturing an air conditioning condenser including tubes, fin members and headers includes supplying a number of tubes corresponding to the total length of n condensers that are intended to be fabricated at one time, respectively disposing the fin members, which have been subjected to cladding treatment, between the tubes, respectively disposing pressing force retainers, which have not been subjected to cladding treatment, between unit tubes each including a predetermined number of tubes, temporarily coupling the headers to both ends of the tubes, brazing all of the components, removing the pressing force retainers from the unit tubes, and cutting the headers to a length corresponding to the length of each of the unit tubes.

5 Claims, 10 Drawing Sheets

FIG. 1

Prior Art

FIG. 2

Prior Art

METHOD OF MANUFACTURING AIR CONDITIONING CONDENSER

CROSS REFERENCE

This application claims foreign priority under Paris Convention to Korean Patent Application No. 10-2015-0012808, filed 27 Jan. 2015, with the Korean Intellectual Property Office.

BACKGROUND OF THE INVENTION

1. Field of the Invention

The present invention relates to a method of manufacturing an air conditioning condenser, and more particularly to a method of manufacturing a plurality of air conditioning condensers at one time by supplying materials for the condenser in amounts corresponding to the total length of the plurality of condensers.

2. Description of the Related Art

A refrigerator typically includes a compressor for compressing gaseous refrigerant into a high-temperature and high-pressure liquid phase, a capillary tube for exchanging heat with external air (heat emission) and changing the phase of the compressed refrigerant passing therethrough into a low temperature and pressure phase, and an evaporator for changing the phase of the low-temperature and low-pressure refrigerant into gaseous refrigerant while exchanging heat with the low-temperature and low-pressure refrigerant passing therethrough and transmitting the gaseous refrigerant to the compressor, in which the compressor, the capillary tube and the evaporator constitute the circulating refrigeration cycle.

Among the respective components constituting the refrigeration cycle, the condenser and the evaporator require heat exchange at high efficiency.

The condenser, which serves to change the high-temperature and high-pressure gaseous refrigerant supplied from the compressor into a low temperature liquid refrigerant, is extensively used in various refrigerating air-conditioning products, such as a refrigerator and an air conditioner.

More specifically, since the gaseous refrigerant having heat obtained from the evaporator is cooled while passing through the condenser, the gaseous refrigerant is changed into liquid refrigerant while emitting heat.

The heat generated from the rear portion of an air conditioner or refrigerator is emitted from the condenser of the air conditioner or refrigerator. Specifically, although gaseous refrigerant is of high temperature and pressure at the inlet of the condenser, the refrigerant is cooled while passing through the inside of the condenser and is thus changed into low-temperature and low-pressure liquid at the outlet of the condenser.

Since it is critical for the condenser or evaporator to be capable of heat change at have high efficiency, the condenser or evaporator is provided with a plurality of radiation fins so as to increase emission of heat from high-temperature and high-pressure refrigerant and thus to improve the efficiency of heat emission.

Technologies relating to such a condenser are disclosed in Korean Patent Registration Publication No. 1284450 and Korean Unexamined Patent Application Publication No. 2014-0023580.

Hereinafter, a jig assembly for brazing of a condenser and a method of manufacturing a condenser using the same, as well as a vehicular air conditioner condenser and a method of manufacturing the same, which are disclosed respectively in Korean Patent Registration Publication No. 1284450 and Korean Unexamined Patent Application Publication No. 2014-0023580, are briefly described as related arts.

Figure 1:
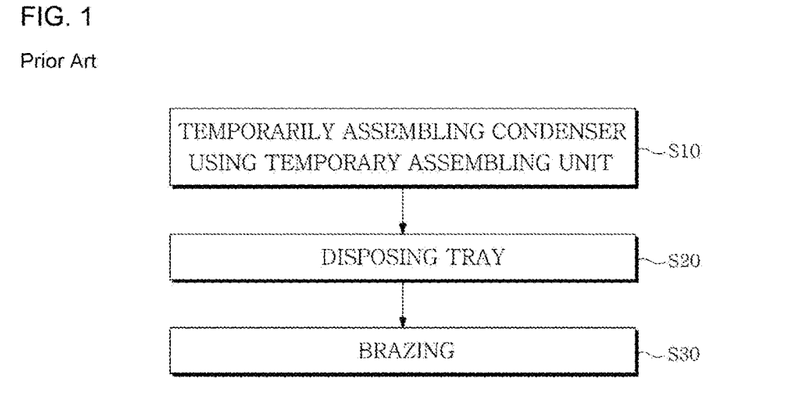
FIG. 1 is a process chart illustrating the method of manufacturing a condenser according to a first related art.

FIG. 1 is a process chart illustrating the method of manufacturing the condenser disclosed in Korean Patent Registration Publication No. 1284450 (hereinafter, referred to as the first related art). As shown in FIG. 1, the method of manufacturing a condenser according to the first related art includes an operation of temporarily assembling, using a temporary assembling unit, a pair of header pipes, which are disposed horizontally and spaced apart from each other, a plurality of tubes, which are coupled at both ends thereof to the pair of header pipes and are spaced apart from each other, a core including a plurality of radiation fins disposed between the plurality of tubes, inlet pipe and outlet pipe connected to one of the pair of header pipes so as to communicate therewith, and a receiver dryer connected to the other of the pair of header pipe so as to communicate therewith (S10), an operation of disposing a tray for supporting the portions of the condenser other than the core upward so as to allow the condenser to be moved (S20), and an operation of brazing the condenser (S30).

In the method of manufacturing a condenser according to the first related art, the temporary assembly of materials for the condenser is performed in such a way that, before the materials for the condenser are placed on a tray, tubes are arranged in units of a predetermined number of tubes, radiation fins are respectively disposed between the tubes, and header pipes are coupled to both ends of the tubes. However, since the predetermined number of tubes is repeatedly arranged for every condenser before assembly, the working hours are increased and thus productivity is deteriorated.

Figure 2:
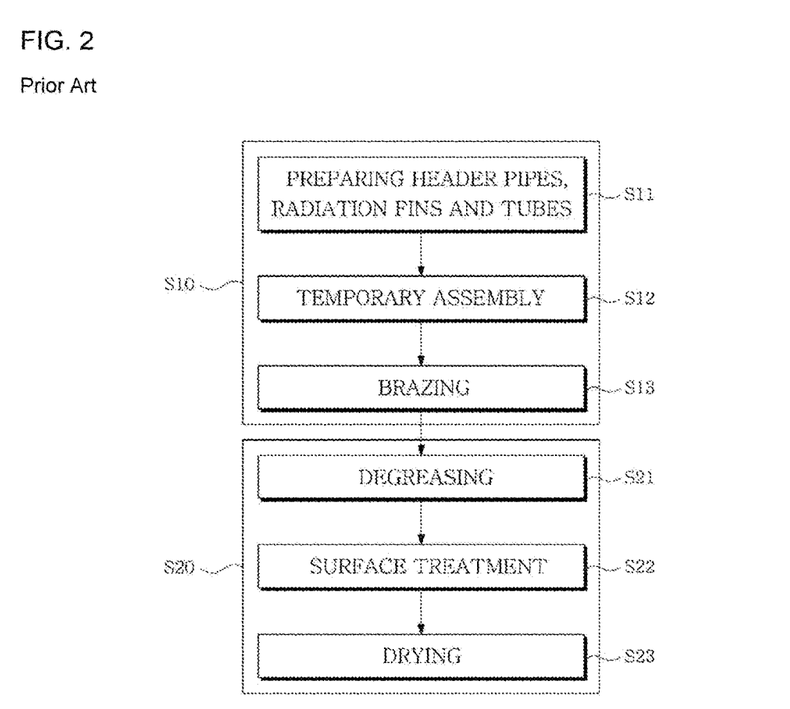
FIG. 2 is a process chart illustrating the method of manufacturing a vehicular air conditioner condenser according to a second related art.

FIG. 2 is a process chart illustrating the method of manufacturing a vehicular air conditioner condenser disclosed in Korean Unexamined Patent Application Publication No. 2014-0023580 (hereinafter, referred to as the second related art). As shown in FIG. 2, the method of manufacturing a vehicular air conditioner condenser according to the second related art includes an operation of preparing a pair of header pipes which are spaced apart from each other, a plurality of tubes which are coupled at both ends thereof to the pair of header pipes and are spaced apart from each other vertically, and a plurality of radiation fins disposed between the plurality of tubes (S11), an operation of temporarily assembling all of the components (S12), an operation of brazing the components (S13), and an operation of treating the surfaces of the header pipes, the radiation fins and the tubes with a combined mixture of a Cr-based composition and a Zr-based composition to form a corrosive-resistant coating layer (S22).

However, since the method of manufacturing a vehicular air conditioner condenser is also performed in such a way that a predetermined number of tubes, between which radiation fins are to be disposed, must be repeatedly arranged for every condenser, productivity is deteriorated.

SUMMARY OF THE INVENTION

Therefore, the present invention has been made in view of the above problems, and it is an object of the present invention to provide a method of manufacturing an air conditioning condenser, which is capable of processing a plurality of unit tubes at one time, thus improving productivity.

In accordance with the present invention, the above and other objects can be accomplished by the provision of a method of manufacturing an air conditioning condenser including tubes, fin members and headers, including supplying a number of tubes corresponding to the total length of n condensers that are intended to be fabricated at one time, respectively disposing the fin members, which have been subjected to cladding treatment, between the tubes, respectively disposing pressing force retainers, which have not been subjected to cladding treatment, between unit tubes each including a predetermined number of tubes, temporarily coupling the headers to both ends of the tubes, brazing all of the components, removing the pressing force retainers from the unit tubes, and cutting the headers to the length corresponding to a length of each of the unit tubes.

The method may further include, prior to supplying the number of tubes, coating the surfaces of the components of the condenser and the pressing force retainers with flux.

The pressing force retainers may be not subjected to cladding treatment, and are thus not brazed when brazing all of the components.

Each of the pressing force retainers may have the same shape as the fin member, the shape having the same size as the fin member or having a smaller size than the fin member.

The pressing force retainers may be made of a material having a high melting point.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, preferred embodiments of the present invention will be described with reference to the attached drawings so as to enable the embodiments to be easily understood by one of ordinary skill in the art to which this invention belongs. However, the present invention is not limited to the embodiments disclosed hereinafter, but may be embodied in different modes. The same reference numbers may refer to the same elements throughout the specification.

Figure 3:
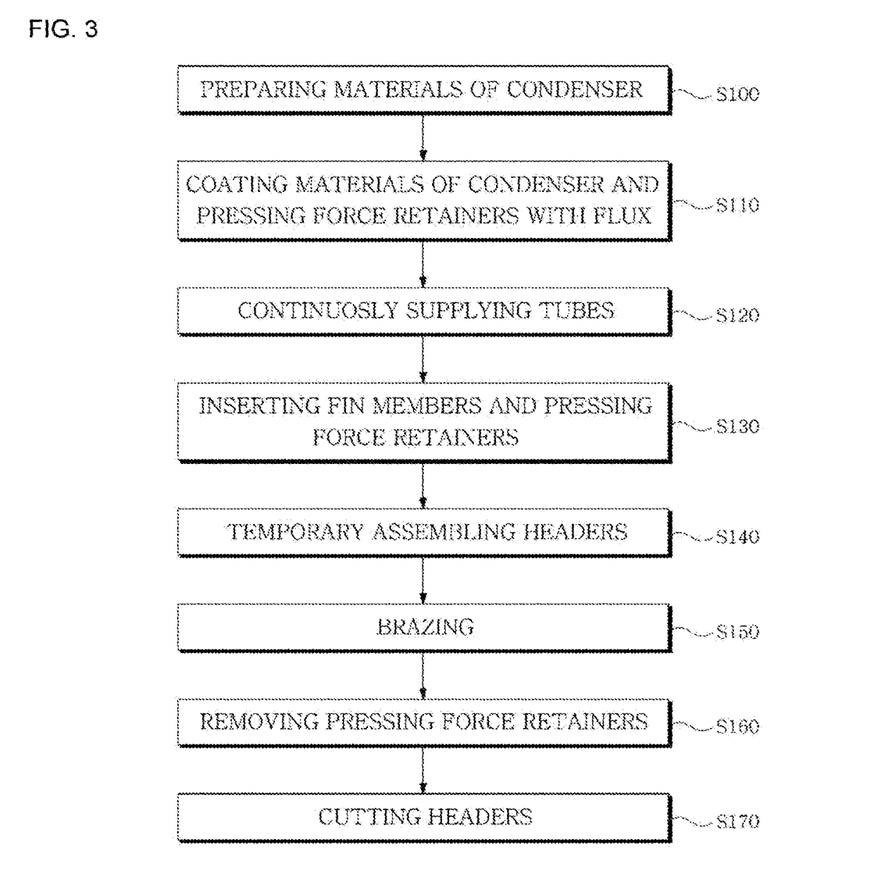
FIG. 3 is a block diagram illustrating a method of manufacturing an air conditioning condenser according to the present invention.
Figure 4:
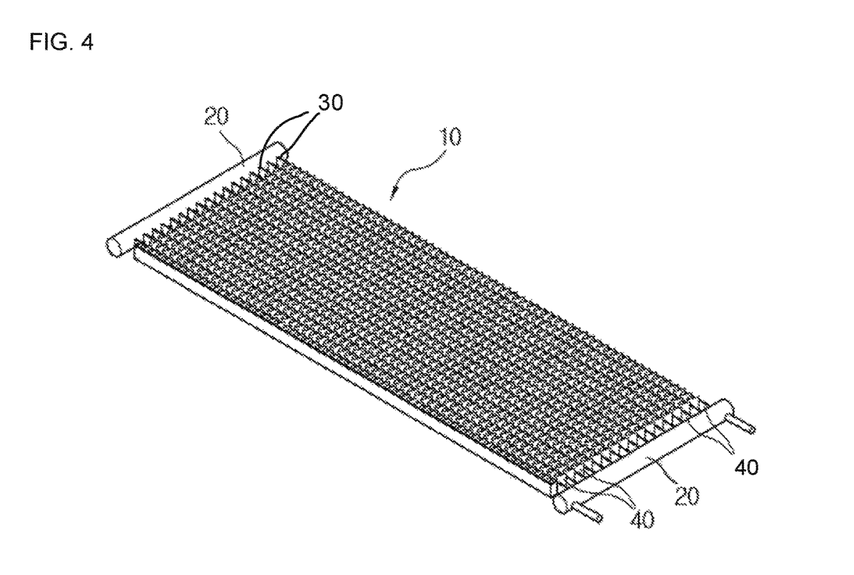
FIG. 4 is a perspective view showing an air conditioning condenser manufactured by the method according to the present invention.
Figure 5:
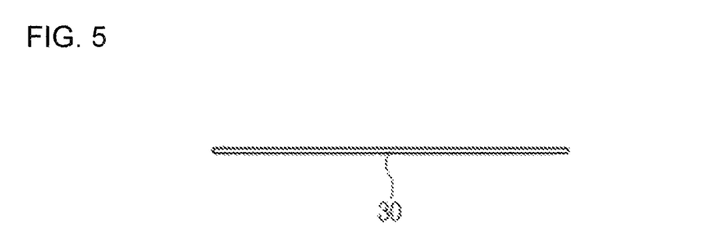
FIGS. 5 to 14 are process charts showing the method of manufacturing the air conditioning condenser according to the present invention.
Figure 6:
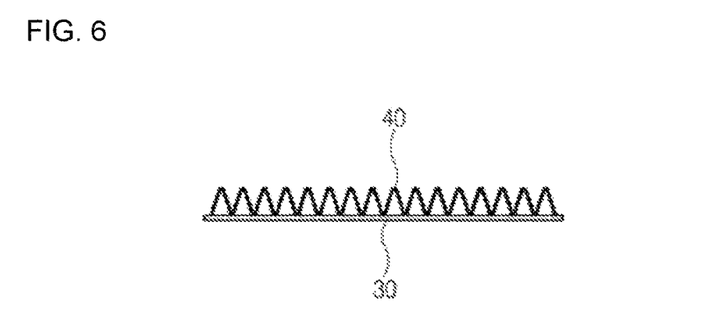
Figure 7:
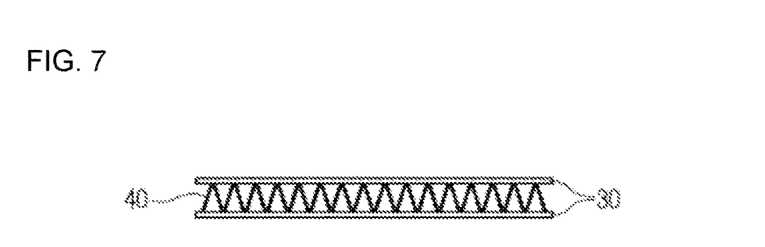
Figure 8:
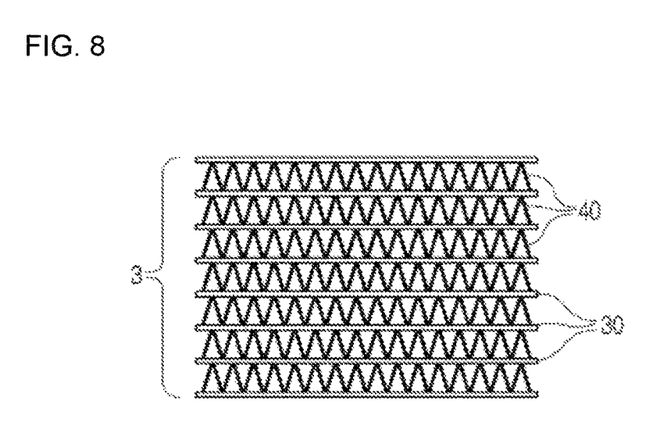
Figure 9:
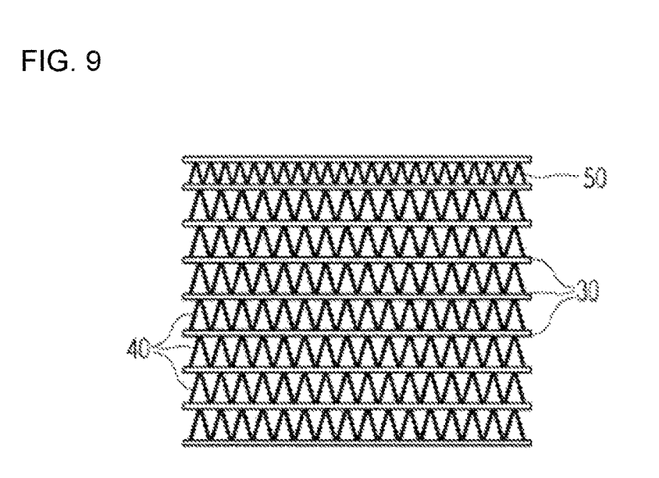
Figure 10:
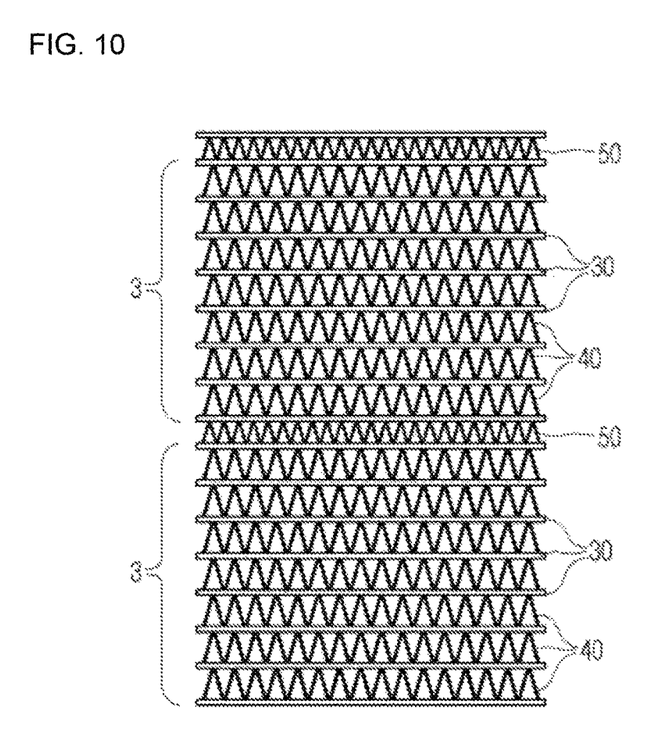
Figure 11:
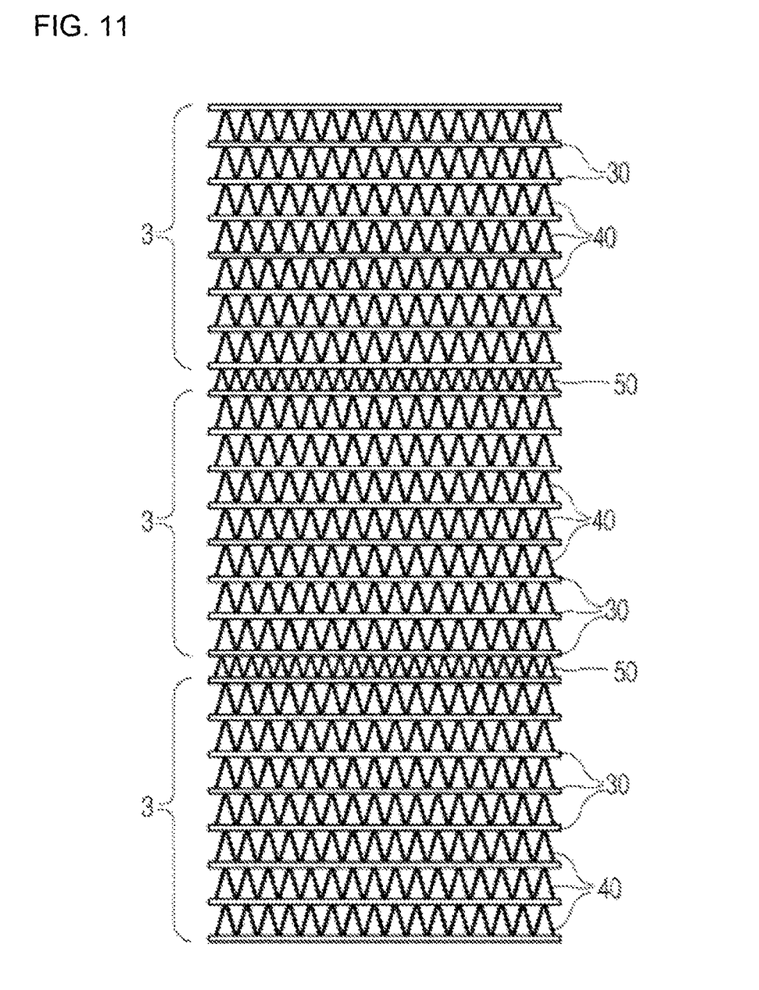
Figure 12:
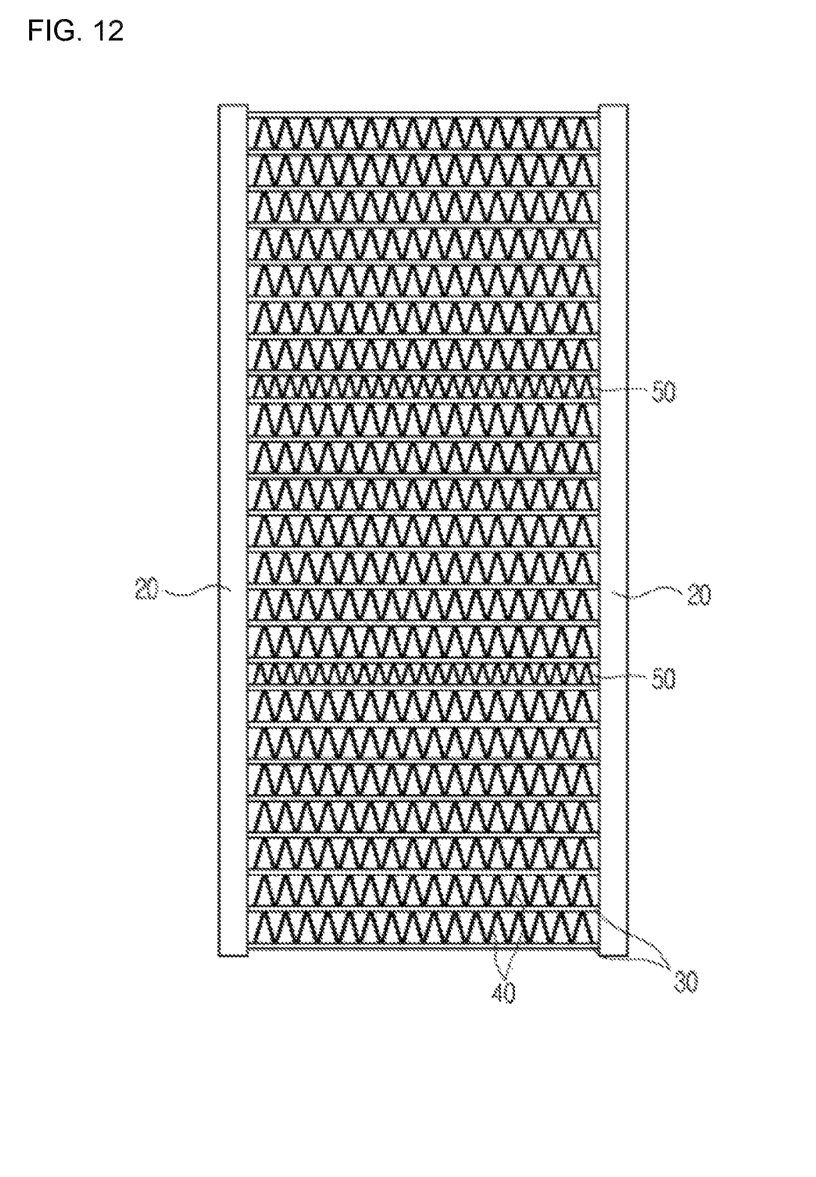
Figure 13:
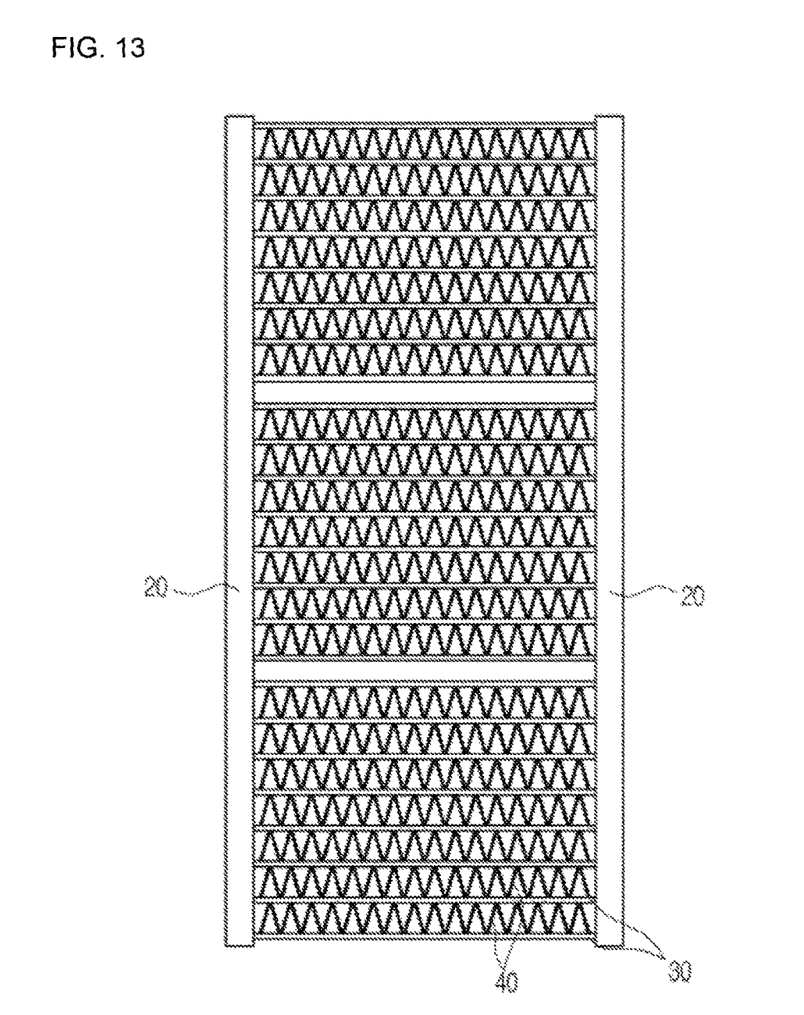
Figure 14:
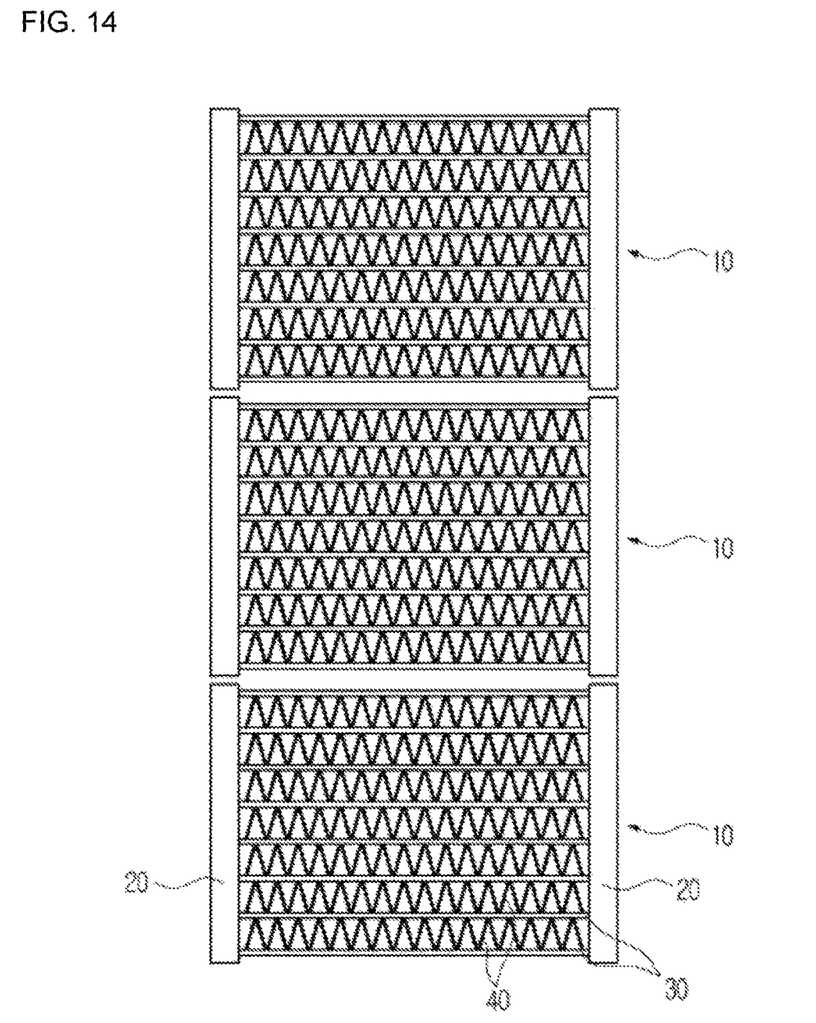

The present invention will now be described with reference to the accompanying drawings. FIG. 3 is a block diagram illustrating a method of manufacturing an air conditioning condenser according to the present invention. FIG. 4 is a perspective view showing an air conditioning condenser manufactured by the method according to the present invention. FIGS. 5 to 14 are process charts showing the method of manufacturing the air conditioning condenser according to the present invention.

The method of manufacturing the air conditioning condenser according to the present invention includes an operation of preparing condenser materials (S100), an operation of coating the condenser materials with flux (S110), an operation of supplying tubes (S120), an operation of inserting fin members and pressing force retainers (S130), an operation of temporarily assembling headers (S140), a brazing operation (S150), an operation of removing a pressing force (S160), and an operation of cutting the headers (S170).

As shown in FIG. 4, the air conditioning condenser manufactured by the method according to the present invention includes headers 20 spaced apart from each other horizontally or vertically, a plurality of tubes 30 connected between the headers 20 and spaced apart from each other, and fin members 40 disposed between the tubes 30 and configured to be corrugated so as to allow refrigerant flowing in the tubes to exchange heat with external air.

Although the fin members 40 are illustrated as being connected between the tubes 30 and as being coupled to the tubes 30 in a line-contact manner, the connecting portions of the fin members 40 may be chamfered so as to be connected to the tubes 30 in a surface-contact manner.

In the operation S100 of preparing the materials for the condenser, the materials for the condenser, such as the headers 20, the tubes 30 and the fin members 40, as well as the pressing force retainers 50 disposed at the boundaries of unit tubes 3, are prepared.

The operation S100 of preparing the materials for the condenser may further include an operation of clad-treating some of the fin members 40.

Specifically, fin members 40 to be disposed between the tubes 30 constituting the unit tube 3 are subjected to cladding treatment. Furthermore, non-clad pressing force retainers 50, which have not been subjected to cladding treatment and which are to be disposed between adjacent unit tubes 3, that is, between the outer surfaces of the outermost tubes 30 of the unit tubes 3 are also prepared.

In the operation S100 of preparing the materials for the condenser, the pressing force retainers 50 are not subjected to cladding treatment so as to prevent the boundary areas of the unit tubes 3 from being brazed. Specifically, in order to prevent brazing at the contact surfaces between the outer surface of the outermost tube 30 and the unit tube 3, the pressing force retainers 50, which are not clad, are disposed between the unit tubes 3.

Among a plurality of tubes 30, which correspond to the total length of the desired number of condensers (n condensers) that are intended to be fabricated at one time, a predetermined of number of tubes 30 constitute one unit tube 3. Since the pressing force retainers 50, which are incapable of being brazed, are respectively disposed between the unit tubes 3, the unit tubes 3, the headers 20 and the fin members 40, all of which have been subjected to cladding treatment, are brazed but the pressing retainers 50, which define the boundaries between the unit tubes 3, i.e. the condensers 10 are not brazed in the brazing process.

The operation S100 of preparing the materials for the condenser may further include an operation of performing cleaning of the materials for the condenser and removal of oxides on the surfaces of the materials for the condenser.

The operation S110 of coating the materials for the condenser with flux is performed so as to coat the materials for the condenser, such as the pressing force retainers 50, the headers 20, the tubes 30 and the fin members 40, with flux.

The operation S120 of supplying the tubes is performed so as to continuously supply a plurality of tubes 30 each having a channel through which refrigerant flows, which correspond to the total length of the desired number of condensers (n condensers) that are intended to be fabricated at one time, in a parallel arrangement using a tube supplying device (not shown).

The operation S130 of inserting the fin members and the pressing force retainers is performed so as to sequentially insert the fin members 40 and the pressing force retainers 50 between respective tubes 30, the plurality of which corresponds to the total length of the desired number of condensers that are intended to be fabricated at one time, in the direction perpendicular to the supply direction of the tubes 40 using a supplying device (not shown).

In other words, the operation S130 of inserting the fin members and the pressing force retainers is performed so as to respectively insert the pressing force retainers 50 between the unit tubes 3 in order to maintain the pressing force between the tubes 30 and the fin members 40.

Specifically, the fin members 40, which are clad, are inserted between the tubes 30 constituting the unit tube 3, and the pressing force retainers 50, which are not clad, are inserted between the outermost tubes 30 of the unit tube 3.

At this point, since the pressing force retainer 50 is disposed between the surface of the outer tube 30 of the unit tube 3 and the surface of the outer tube 30 of the adjacent unit tube 3 and the brazing is subsequently performed, the pressing force retainers 50 cannot be brazed between the facing surfaces of the adjacent unit tubes 3.

Each of the pressing force retainers 50 may also have a corrugated shape, which has the same shape as the fin member 40 and which has the same size as the fin member 40 or a smaller size than the fin member 40.

The pressing force retainers 50 may be made of a material having a high melting point. When the pressing force retainers 50 are made of a material having a high melting point, the pressing force retainers 50 are not brazed because they are not subjected to the cladding treatment, and it is possible to prevent the pressing force retainers 50 from melting due to an increase in the temperature inside a brazing furnace in the event of malfunction of the brazing furnace.

The operation S140 of temporarily assembling the headers 20 is performed so as to temporarily assemble the headers 20 with both ends of a plurality of tubes 30, which correspond to the total length of the plurality of condensers that are intended to be fabricated at one time, using a temporary assembling device (not shown).

In the operation S140 of temporarily assembling the headers 20, both ends of the plurality of tubes 30 are fitted into fitting holes formed in side surfaces of the headers 20. At this time, the header 20 is configured to be the same length as the plurality of tubes 30, which correspond to the total length of the plurality of condensers that are intended to be fabricated at one time.

The brazing operation S150 is performed to braze the materials for the condenser, such as the headers 20, the tubes 30 and the fin members 40, which correspond to the total length of the plurality of condensers that are intended to be fabricated at one time, and the pressing force retainers 50 disposed between the facing surfaces of the unit tubes 30 by passing these components through a continuous brazing furnace.

In the brazing operation S150, since the facing surfaces of the outermost tubes 30 of the unit tubes 3 and the pressing force retainers 50 disposed between the unit tubes 3 are not clad, the facing surfaces are not brazed.

The operation S160 of removing the pressing force retainers is performed to remove the pressing force retainers 50 from the outermost tubes 30 of the unit tubes 3 constituting the condenser 10 after the execution of the brazing operation S150.

The operation S170 of cutting the headers 20 is performed to cut the headers 20 to a length corresponding to the length of the unit tube 3 constituting the unit condenser 10, thus providing n condensers 10.

An operation of finishing of the cut surfaces of the headers 20 may further be performed after the operation S170.

As described above, according to the present invention, materials for the condensers, which correspond to the total length of the plurality of condensers that are intended to be fabricated at one time, are supplied, and the pressing force retainers 50 are not clad so as to prevent brazing of the contact areas between the surfaces of the outermost tubes of the unit tubes 3 and the pressing force retainers 50, which are disposed between the unit tubes 3 to constitute the boundaries of the unit tubes 3.

Specifically, when tubes 30 corresponding in total length to the a plurality of condensers 10 that are intended to be fabricated at one time are continuously supplied, the pressing force retainers 50, which are incapable of being brazed are disposed between the unit tubes 3 each including a predetermined number of tubes 30, and the brazing operation is subsequently performed. Accordingly, the production time is remarkably reduced compared to a conventional process, and productivity is thus improved.

As is apparent from the above description, according to the present invention, fin members are respectively disposed between a number of tubes 30 corresponding to the total length of the plurality of condensers 10 that are intended to be fabricated at one time, and the pressing force retainers, which are not clad, are sequentially inserted into the boundary spaces defined between the unit tubes, each including a predetermined number of tubes, so as to prevent the boundary portions between the unit tubes from being brazed. Subsequently, the headers each having a length corresponding to the total length of the plurality of tubes are coupled to both ends of the tubes, and the brazing process is performed. Thereafter, the headers are cut to the length corresponding to the length of the unit condenser. Accordingly, unlike a conventional process of separately manufacturing respective condensers, thus entailing transfer time intervals between respective unit condensers, a plurality of unit tubes are processed at one time, thus improving productivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing an air conditioning condenser including tubes, fin members and headers, comprising:
   supplying a number of tubes corresponding to a total length of n condensers that are intended to be fabricated at one time;
   respectively disposing the fin members, which are subjected to cladding treatment, between the tubes;
   respectively disposing pressing force retainers, which have not been subjected to cladding treatment, between unit tubes each including a predetermined number of tubes;
   temporarily coupling the headers to both ends of the tubes;
   brazing all of the components;

removing the pressing force retainers from the unit tubes; and cutting the headers to a length corresponding to a length of each of the unit tubes.

2. The method according to claim 1, further comprising, prior to supplying the number of tubes, coating surfaces of the tubes, the fin members, the headers and the pressing force retainers with flux.

3. The method according to claim 1, wherein the pressing force retainers are not subjected to cladding treatment, and are thus not brazed when brazing all of the components.

4. The method according to claim 1, wherein each of the pressing force retainers has the same shape as the fin member, the shape having the same size as the fin member or having a smaller size than the fin member.

5. The method according to claim 4, wherein the pressing force retainers are made of a material having a high melting point.

\* \* \* \* \*